(12) United States Patent
Yu et al.

(10) Patent No.: US 11,830,242 B2
(45) Date of Patent: Nov. 28, 2023

(54) METHOD FOR GENERATING A LICENSE PLATE DEFACEMENT CLASSIFICATION MODEL, LICENSE PLATE DEFACEMENT CLASSIFICATION METHOD, ELECTRONIC DEVICE AND STORAGE MEDIUM

(71) Applicant: BEIJING BAIDU NETCOM SCIENCE TECHNOLOGY CO., LTD., Beijing (CN)

(72) Inventors: Yue Yu, Beijing (CN); Xiao Tan, Beijing (CN); Hao Sun, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 226 days.

(21) Appl. No.: 17/450,261

(22) Filed: Oct. 7, 2021

(65) Prior Publication Data

US 2022/0027651 A1    Jan. 27, 2022

(30) Foreign Application Priority Data

Jan. 22, 2021  (CN) .......................... 202110090978.1

(51) Int. Cl.
*G06K 9/00* (2022.01)
*G06K 9/62* (2022.01)
(Continued)

(52) U.S. Cl.
CPC .......... *G06V 10/95* (2022.01); *G06F 18/2137* (2023.01); *G06F 18/2148* (2023.01);
(Continued)

(58) Field of Classification Search
CPC ...... G06V 10/95; G06V 20/56; G06V 20/625; G06F 18/2178; G06F 18/2148; G06F 18/241; G06F 18/2137; G06N 3/08
See application file for complete search history.

(56) References Cited

U.S. PATENT DOCUMENTS

2020/0193232 A1*  6/2020  Wang ..................... G06N 3/04

FOREIGN PATENT DOCUMENTS

| CN | 107229929 A | 10/2017 |
| CN | 110909692 A | 3/2020 |
| CN | 111369528 A | 7/2020 |

OTHER PUBLICATIONS

Xing et al, "Anti-alteration Technology for License Plate Recognition System", 2011, Advanced Materials Research ISSN: 1662-8985, vols. 211-212, pp. 156-160 (5 pages) (Year: 2011).*

(Continued)

*Primary Examiner* — David F Dunphy
(74) *Attorney, Agent, or Firm* — Patterson Thuente, P.A.

(57) ABSTRACT

A method for generating a license plate defacement classification model, a license plate defacement classification method an electronic device and a storage medium, and related to the technical field of artificial intelligence, and specifically, to the technical field of computer vision and the technical field of intelligent transportation are provided. The method for generating a license plate defacement classification model includes: acquiring training data, wherein the training data includes a plurality of annotated vehicle images, annotated content includes information indicating that a license plate is defaced or is not defaced, and the annotated content further includes location information of a license plate area; and training a first neural network by using the training data, to obtain the license plate defacement classification model for predicting whether the license plate in a target vehicle image is defaced. A robust license plate defacement classification model can be obtained by using embodiments.

20 Claims, 4 Drawing Sheets

```
acquiring training data, wherein the training data
includes a plurality of annotated vehicle images,
annotated content includes information indicating that a    ─ S101
license plate is defaced or is not defaced, and the
annotated content further includes location information
of a license plate area

↓ training a first neural network by using the training data,   ─ S102
to obtain the license plate defacement classification
model for predicting whether the license plate in a target
vehicle image is defaced
```

(51) Int. Cl.
 *G06N 3/08* (2023.01)
 *G06V 10/94* (2022.01)
 *G06V 20/56* (2022.01)
 *G06F 18/241* (2023.01)
 *G06F 18/2137* (2023.01)
 *G06F 18/214* (2023.01)
 *G06F 18/21* (2023.01)
 *G06V 20/62* (2022.01)

(52) U.S. Cl.
 CPC ........ *G06F 18/2178* (2023.01); *G06F 18/241* (2023.01); *G06N 3/08* (2013.01); *G06V 20/56* (2022.01); *G06V 20/625* (2022.01)

(56) References Cited

OTHER PUBLICATIONS

Extended European Search Report for Application No. 21210428.5, dated May 19, 2022, 9 pages.
Hui J., "Real-Time Object Detection with YOLO, YOLOv2 and now YOLOv3", Mar. 18, 2018, XP055920075, Retrieved from https://jonathan-hui.medium.com/real-time-object-detection-with-yolo-yolov2-28b1b93e2088, on May 11, 2022, 34 pages.

* cited by examiner

METHOD FOR GENERATING A LICENSE PLATE DEFACEMENT CLASSIFICATION MODEL, LICENSE PLATE DEFACEMENT CLASSIFICATION METHOD, ELECTRONIC DEVICE AND STORAGE MEDIUM

CROSS-REFERENCE TO RELATED APPLICATION

This application claims priority to Chinese patent application No. 202110090978.1, filed on Jan. 22, 2021, which is hereby incorporated by reference in its entirety.

TECHNICAL FIELD

The present disclosure relates to the technical field of artificial intelligence, and specifically, to the technical field of computer vision and the technical field of intelligent transportation, and in particular, to a method for generating a license plate defacement classification model, a license plate defacement classification method and an apparatus, a device, a storage medium, and a license plate defacement classification model.

BACKGROUND

Nowadays, vehicle management is becoming increasingly important along with a rising number of automobiles in cities and towns. Every automobile has its own license plate. Therefore, the management of vehicle license plates is an important branch of vehicle management. How to improve existing license plate recognition technologies and improve the recognition efficiency of defaced license plates has always been the focus of research. At present, most license plate defacement recognition models take a picture of an entire vehicle as an input, and a license plate accounts for only a small proportion of the input picture.

SUMMARY

The present disclosure provides a method for generating a license plate defacement classification model, a license plate defacement classification method and an apparatus, a device, a storage medium and a license plate defacement classification model, to solve at least one of the above problems.

According to a first aspect of the present disclosure, there is provided a method for generating a license plate defacement classification model, including:

acquiring training data, wherein the training data includes a plurality of annotated vehicle images, annotated content includes information indicating that a license plate is defaced or is not defaced, and the annotated content further includes location information of a license plate area; and training a first neural network by using the training data, to obtain the license plate defacement classification model for predicting whether the license plate in a target vehicle image is defaced, wherein loss functions used in the training include a cross-entropy loss function and a class activation map loss function, the cross-entropy loss function is used for performing supervised learning on whether the license plate is defaced, and the class activation map loss function is used for performing supervised learning on a license plate location, wherein the class activation map loss function is obtained by comparing the annotated vehicle image with a class activation map corresponding to the annotated vehicle image.

According to a second aspect of the present disclosure, there is provided a license plate defacement classification method, which is based on a license plate defacement classification model generated by using the foregoing method, wherein the license plate defacement classification method includes:

inputting a target vehicle image to the license plate defacement classification model;

predicting, by the license plate defacement classification model, whether a license plate in the target vehicle image is defaced; and receiving a prediction result output by the license plate defacement classification model, wherein the prediction result includes information indicating that the license plate is defaced or is not defaced.

According to a third aspect of the present disclosure, there is provided an apparatus for generating a license plate defacement classification model, including:

an acquisition module configured for acquiring training data, wherein the training data includes a plurality of annotated vehicle images, annotated content includes information indicating that a license plate is defaced or is not defaced, and the annotated content further includes location information of a license plate area; and a training module configured for training a first neural network by using the training data, to obtain the license plate defacement classification model for predicting whether the license plate in a target vehicle image is defaced, wherein loss functions used in the training by the training module include a cross-entropy loss function and a class activation map loss function, the cross-entropy loss function is used for performing supervised learning on whether the license plate is defaced, and the class activation map loss function is used for performing supervised learning on a license plate location, wherein the class activation map loss function is obtained by comparing the annotated vehicle image with a class activation map corresponding to the annotated vehicle image.

According to a fourth aspect of the present disclosure, there is provided a license plate defacement classification apparatus, which is based on the license plate defacement classification model generated by using the foregoing method for generating a license plate defacement classification model, wherein the license plate defacement classification apparatus includes:

an input module configured for inputting a target vehicle image to the license plate defacement classification model;

the license plate defacement classification model configured for predicting whether a license plate in the target vehicle image is defaced; and a receiving module configured for receiving a prediction result output by the license plate defacement classification model, wherein the prediction result includes information indicating that the license plate is defaced or is not defaced.

According to a fifth aspect of the present disclosure, there is provided an electronic device, including:

at least one processor; and a memory communicatively connected with the at least one processor, wherein the memory stores instructions executable by the at least one processor, the instructions being executed by the at least one processor to enable the at least one processor to execute the foregoing method.

According to a sixth aspect of the present disclosure, there is provided a non-transitory computer-readable storage medium storing computer instructions for enabling a computer to execute the foregoing method.

According to a seventh aspect of the present disclosure, there is provided a computer program product including a computer program which, when executed by a processor, causes the processor to execute the foregoing method.

According to an eighth aspect of the present disclosure, there is provided a license plate defacement classification model, wherein the license plate defacement classification model is a license plate defacement classification model generated by using the foregoing method for generating a license plate defacement classification model.

It should be understood that the content described in this section is neither intended to limit the key or important features of the embodiments of the present disclosure, nor intended to limit the scope of the present disclosure. Other features of the present disclosure will be readily understood through the following description.

BRIEF DESCRIPTION OF THE DRAWINGS

The drawings are used to better understand the scheme and do not constitute a limitation to the present disclosure. In which.

DETAILED DESCRIPTION OF THE DRAWINGS

Exemplary embodiments of the present disclosure are described below in combination with the drawings, including various details of the embodiments of the present disclosure to facilitate understanding, which should be considered as exemplary only. Thus, those of ordinary skill in the art should realize that various changes and modifications can be made to the embodiments described here without departing from the scope and spirit of the present disclosure. Likewise, descriptions of well-known functions and structures are omitted in the following description for clarity and conciseness.

Figure 1:
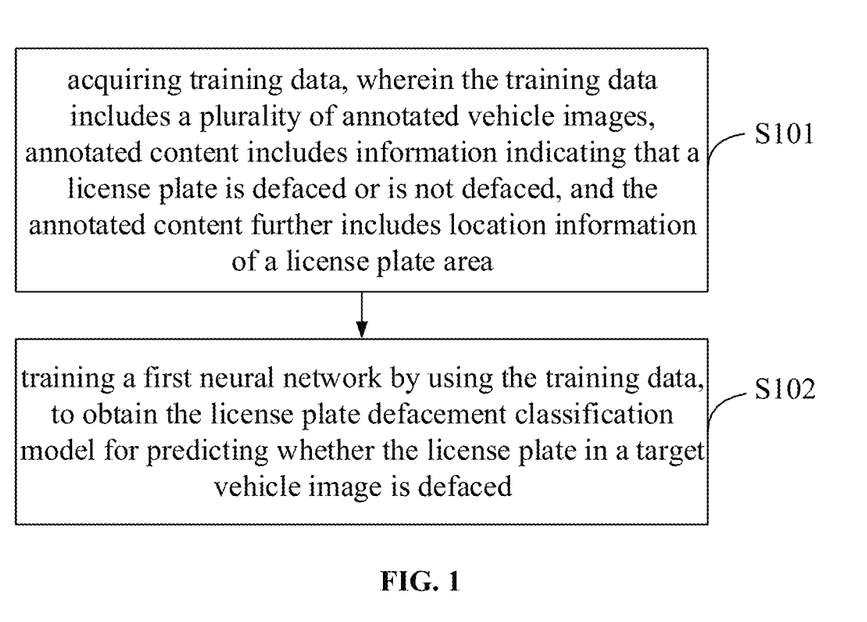
FIG. 1 is a flow block diagram of a method for generating a license plate defacement classification model according to an embodiment of the present disclosure.

FIG. 1 is a flow block diagram of a method for generating a license plate defacement classification model according to an embodiment of the present disclosure. The method includes:

S101: acquiring training data, wherein the training data includes a plurality of annotated vehicle images, annotated content includes information indicating that a license plate is defaced or is not defaced, and the annotated content further includes location information of a license plate area; and S102: training a first neural network by using the training data, to obtain the license plate defacement classification model for predicting whether the license plate in a target vehicle image is defaced, wherein loss functions used in the training include a cross-entropy loss function and a class activation map loss function, the cross-entropy loss function is used for performing supervised learning on whether the license plate is defaced, and the class activation map loss function is used for performing supervised learning on a license plate location, wherein the class activation map loss function is obtained by comparing the annotated vehicle image with a class activation map corresponding to the annotated vehicle image.

According to embodiments of the present disclosure, training data used during training of a neural network includes vehicle images annotated with license plate areas and information indicating whether a license plate is defaced, and high-energy areas of class activation maps in a network can be restricted to the annotated license plate areas by using a specially designed loss function based on a class activation map, such that the network can focus on features in the license plate areas and ignore other background features except the license plate areas. Because the background features in the images are excluded, a model generated by training can more accurately determine defaced license plates, with high model robustness.

A class activation map (CAM) is usually a class activation heatmap generated based on an input image, which can represent the importance of each location relative to a corresponding class. According to the embodiment of the present disclosure, training data used during training of a neural network includes vehicle images annotated with license plate areas and information indicating whether a license plate is defaced, and a loss function based on a class activation map is specially designed, so that high-energy areas of class activation maps in a network can be restricted to the annotated license plate areas, such that the network can focus on features in the license plate areas and ignore other background features except the license plate areas. Because the background features in the images are excluded, a model generated can more accurately and rapidly determine defaced license plates, thereby easily completing a license plate defacement recognition task.

In the embodiment of the present disclosure, optionally, that the class activation map loss function is obtained by comparing the annotated vehicle image with a class activation map corresponding to the annotated vehicle image can be implemented by the following processing:

extracting a feature map of the annotated vehicle image by the first neural network;

calculating the class activation map corresponding to the annotated vehicle image based on the feature map; and comparing an obtained class activation map with the annotated vehicle image, and using an element in an area except the license plate area in the class activation map as a loss, to obtain the class activation map loss function.

Through the above processing, the obtained class activation map is compared with the annotated license plate area, and it may be considered that class activation map information that falls within the license plate area is useful information, based on which it can be determined whether the license plate is defaced, while class activation map information that falls beyond the license plate area is useless background information and should be ignored. Therefore, the class activation map information that falls beyond the license plate area is used as a loss, to form a class activation map loss function, which should be made as small as possible and approach zero in the training process. Further, a cross-entropy loss of a classification network is used to perform learning on license plate defacement situations, and a model obtained after the training is completed can restrict the high-energy areas to be predicted and processed to the license plate area, and ignore information other than the license plate. Therefore, computing time can be compressed and the efficiency of model processing can be improved. In addition, the generated model has good robustness because it is not prone to interference by factors unrelated to the license plate in the image.

In the embodiment of the present disclosure, optionally, the method further includes: performing upsampling or downsampling on the class activation map, such that dimensions of the class activation map and the annotated vehicle image are same. To better compare a difference between the class activation map and the input image, upsampling or downsampling processing is performed on the class activation map, to be of the same dimension as the input image, such that image elements in the license plate area and image elements outside the license plate area can be located more accurately in a comparison process, which facilitates processing of subsequent steps.

In the embodiment of the present disclosure, optionally, the location information of the license plate area is annotated with a bounding box (or be referred to as bbox). Herein, the bbox is used to annotate the license plate area. That is, coordinate information (for example, coordinates of a top left corner vertex) and dimension information (width and height) of the license plate area are annotated. The annotated bbox information can be used to locate the license plate area, such that a high-energy area of the class activation map is concentrated within the license plate area surrounded by the bbox.

In the embodiment of the present disclosure, optionally, the class activation map loss function is expressed by a following formula:

$$L_{CAM} = \Sigma_{i=0}^{n} x_i w_i$$

wherein $L_{CAM}$ denotes a class activation map loss function, $x_i$ denotes an i-th element in a class activation map, and is a variable for determining whether the i-th element is located within a bbox, wherein in a case where the i-th element is located within the bbox, $w_i$ is 0, and in a case where the i-th element is located outside the bbox, $w_i$ is 1.

Based on the above expression, an element within the bbox may be set to 0 in the model training process, while an element outside the bbox is reserved, so as to use the element outside the bbox as a loss. The value of the element outside the bbox is continuously reduced (to make the value approach 0) by tuning a parameter in the training process. Through such supervised learning, the model that has been trained can ignore the element outside the bbox, and focus only on the element within the bbox, so as to restrict the high-energy area to the annotated license plate area.

Figure 2:
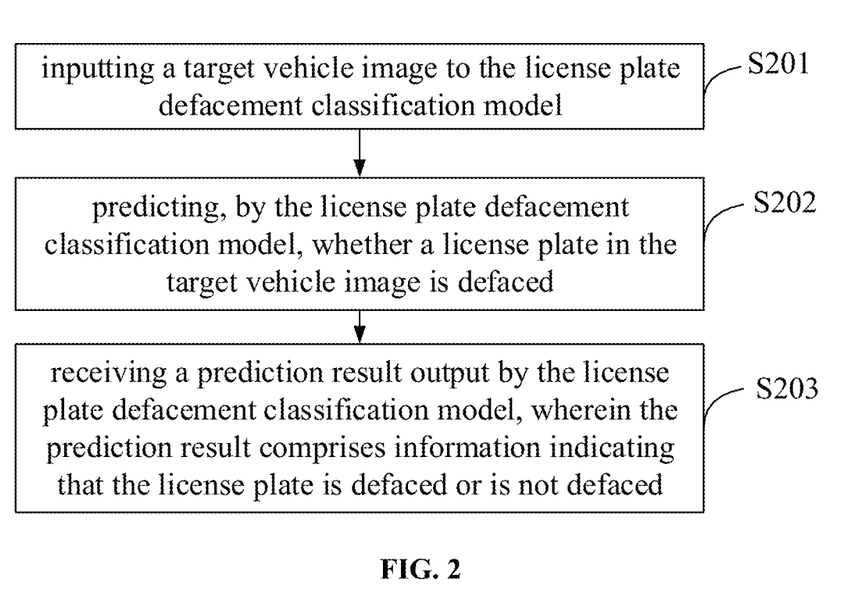
FIG. 2 is a flow block diagram of a license plate defacement classification method according to an embodiment of the present disclosure.

FIG. 2 shows a license plate defacement classification method according to an embodiment of the present disclosure, which is based on the license plate defacement classification model generated by using the foregoing method for generating a license plate defacement classification model. The license plate defacement classification method includes:

S201: inputting a target vehicle image to the license plate defacement classification model; S202: predicting, by the license plate defacement classification model, whether a license plate in the target vehicle image is defaced; and S203: receiving a prediction result output by the license plate defacement classification model, wherein the prediction result includes information indicating that the license plate is defaced or is not defaced.

The license plate defacement classification model according to the embodiment of the present disclosure can be used for predicting whether a license plate in a vehicle image is defaced. The license plate defacement classification model is used for predicting an input picture to complete a license plate defacement recognition task. The license plate defacement classification model has good robustness and is applicable to license plate defacement classification under various environmental conditions, and a prediction result is highly reliable.

The foregoing describes various implementations of and advantages achieved by the method for generating a license plate defacement classification model according to the embodiment of the present disclosure. Specific processing procedures of the embodiment of the present disclosure are described in detail below by using specific examples.

Figure 3:
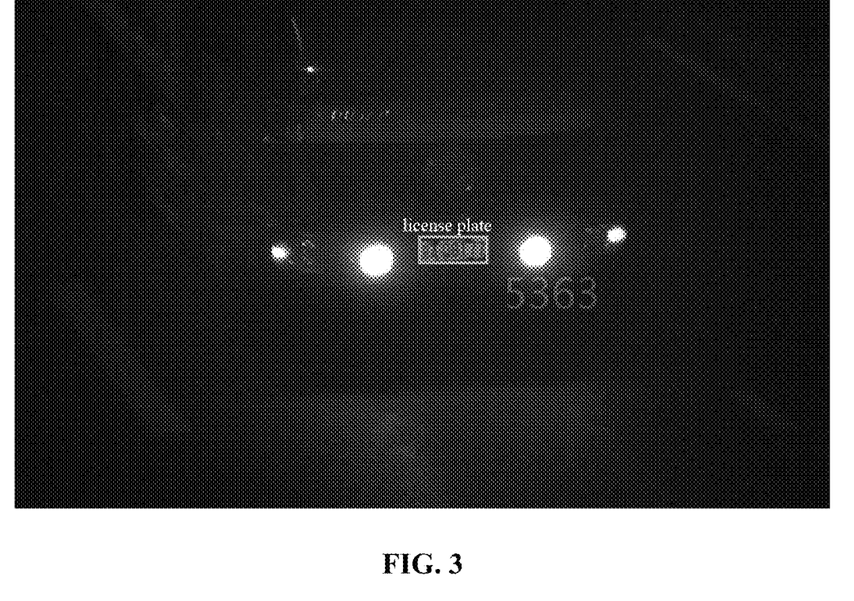
FIG. 3 is a schematic diagram of a vehicle image processed in an embodiment of the present disclosure.
Figure 4:
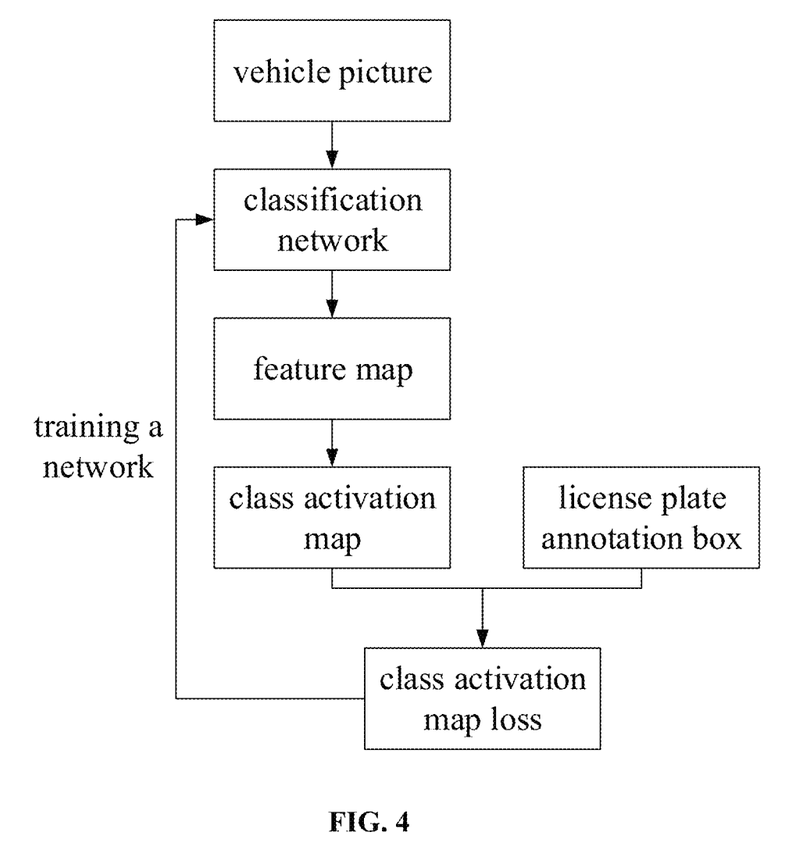
FIG. 4 is a schematic diagram of a training process of a license plate defacement classification model according to an embodiment of the present disclosure.

FIG. 3 schematically shows a vehicle image processed in an embodiment of the present disclosure, wherein a license plate area is annotated with a bbox (bounding box). Referring to FIG. 4, the processing procedures are described as follows.

(1) Extract a Feature Map of a Vehicle Picture.

In an implementation of the present disclosure, a residual network Res18 may be used as a classification network to be trained, and feature extraction is first performed on the input vehicle picture, to obtain the feature map of the vehicle picture.

(2) Compute a Class Activation Map of the Classification Network.

In an implementation of the present disclosure, the feature map obtained in step (1) is multiplied by a weight of a corresponding class (for example, a license plate defacement class), so that a class activation map of the network for the license plate can be obtained, wherein an initial weight may be a random number or 0. A specific computing formula for the class activation map CAM is as follows:

$$CAM = \Sigma_{i=1}^{n} w_i^c A_i$$

where A is a feature map output by the Res18 network, w is a weight of a fully connected layer, a subscript i denotes an i-th element in the feature map, and c is a corresponding class. Herein, an element at each location in the class activation map corresponds to c weights in all the subsequent fully connected layers.

Then, upsampling or downsampling processing is performed on the obtained class activation map CAM, to make its dimension the same as that of the input picture, which facilitates subsequent processing.

(3) Compute a Loss Based on Information about the License Plate Annotation Box.

The obtained class activation map is compared with the annotated license plate area. Information in class activation map that falls beyond the license plate area is used as useless background information, and these elements are used as losses, which are used for supervised learning of a license plate location. In addition, a cross-entropy loss, which is commonly used in a classification network, is used for supervised learning of defacement annotated for the license plate, and the training of the Res18 network is performed. Specifically, the loss function L is as follows:

$$L = L_{CE} + L_{CAM}$$

$$L_{CAM} = \Sigma_{i=0}^{n} x_i w_i$$

where $L_{CE}$ denotes a cross-entropy loss, $L_{CAM}$ denotes a class activation map loss, $x_i$ denotes an i-th element in a class activation map, and is a variable for determining whether the i-th element is located within the bbox, in a case where the i-th element is located within the bbox, $w_i$ is 0, and in a case where the i-th element is located outside the bbox, $w_i$ is 1.

Through the above processing, in the network training process, parts of the class activation map that are greater than 0 may be forced to concentrate within the bbox, while $x_i$ that falls beyond the bbox will be used as a loss and added to a final total loss function; and $x_i$ that falls within the bbox will not be counted as a loss, and corresponds to the "$x_i w_i$" part in the formula.

In this way, areas with the highest value of the class activation map of the license plate defacement class can be concentrated within the bbox, so that key areas concerned by the network focus on the license plate, thereby reducing interference caused by an image except for the license plate area to the final classification of whether the license plate is defaced, and enhancing the robustness of the model.

(4) Train the Classification Network to Update a Parameter.

In an implementation of the present disclosure, based on the loss obtained in step (3), a gradient descent method is used to train the network, to update a network parameter.

Through the iterative optimization from steps (1) to (4), the training is completed after the model converges or a specific training duration is reached, and then a license plate defacement classification model can be obtained, to predict whether a license plate in a vehicle image is defaced. The license plate defacement classification model is used to predict an input picture, thereby completing the license plate defacement recognition task.

Figure 5:
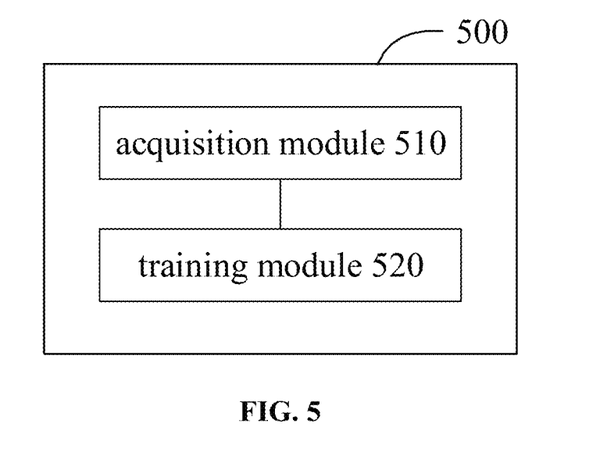
FIG. 5 is a structural block diagram of an apparatus for generating a license plate defacement classification model according to an embodiment of the present disclosure.

Specific settings and implementations of the embodiment of the present disclosure are described above from different perspectives by using a plurality of embodiments. Corresponding to the processing method of at least one of the foregoing embodiments, an embodiment of the present disclosure further provides an apparatus 500 for generating a license plate defacement classification model. Referring to FIG. 5, the apparatus includes:

an acquisition module 510 configured for acquiring training data, wherein the training data includes a plurality of annotated vehicle images, annotated content includes information indicating that a license plate is defaced or is not defaced, and the annotated content further includes location information of a license plate area; and a training module 520 configured for training a first neural network by using the training data, to obtain the license plate defacement classification model for predicting whether the license plate in a target vehicle image is defaced, wherein loss functions used in the training by the training module include a cross-entropy loss function and a class activation map loss function, the cross-entropy loss function is used for performing supervised learning on whether the license plate is defaced, and the class activation map loss function is used for performing supervised learning on a license plate location, wherein the class activation map loss function is obtained by comparing the annotated vehicle image with a class activation map corresponding to the annotated vehicle image.

Optionally, the training module 520 includes:

an extraction submodule configured for extracting a feature map of the annotated vehicle image by the first neural network;

a calculation submodule configured for calculating the class activation map corresponding to the annotated vehicle image based on the feature map; and a loss function processing submodule configured for comparing an obtained class activation map with the annotated vehicle image, and using an element in an area except the license plate area in the class activation map as a loss, to obtain the class activation map loss function.

Optionally, the apparatus 500 for generating a license plate defacement classification model further includes:

a feature map processing module configured for performing upsampling or downsampling on the class activation map, such that dimensions of the class activation map and the annotated vehicle image are same.

Optionally, the location information of the license plate area is annotated with a bbox.

Optionally, the class activation map loss function is expressed by a following formula:

$$L_{CAM} = \Sigma_{i=0}^{n} x_i w_i$$

wherein $L_{CAM}$ of denotes a class activation map loss function, denotes an i-th element in a class activation map, and $x_i$ is a variable for determining whether the i-th element is located within a bbox, wherein in a case where the i-th element is located within the bbox, $w_i$ is 0, and in a case where the i-th element is located outside the bbox, $w_i$ is 1.

Figure 6:
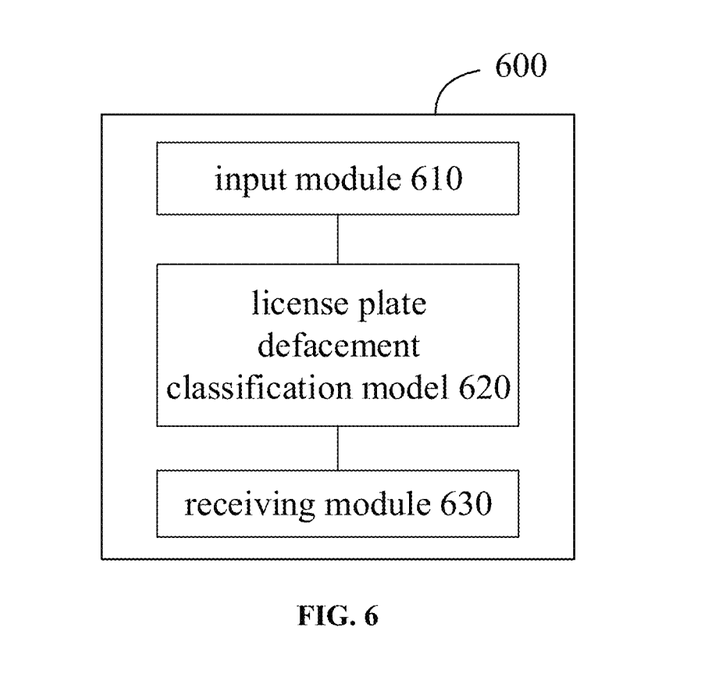
FIG. 6 is a structural block diagram of a license plate defacement classification apparatus according to an embodiment of the present disclosure.

Corresponding to the processing method of at least one of the foregoing embodiments, an embodiment of the present disclosure further provides a license plate defacement classification apparatus 200, which is based on the license plate defacement classification model generated by using the foregoing method for generating a license plate defacement classification model. Referring to FIG. 6, the license plate defacement classification apparatus 600 includes:

an input module 610 configured for inputting a target vehicle image to the license plate defacement classification model;

the license plate defacement classification model 620 configured for predicting whether a license plate in the target vehicle image is defaced; and a receiving module 630 configured for receiving a prediction result output by the license plate defacement classification model, wherein the prediction result includes information indicating that the license plate is defaced or is not defaced.

The functions of respective modules in each apparatus of the embodiments of the present disclosure may be seen in the processes correspondingly described in the embodiments of the method described above and will not be described in detail herein.

According to embodiments of the present disclosure, the present disclosure further provides an electronic device, a readable storage medium, and a computer program product.

Figure 7:
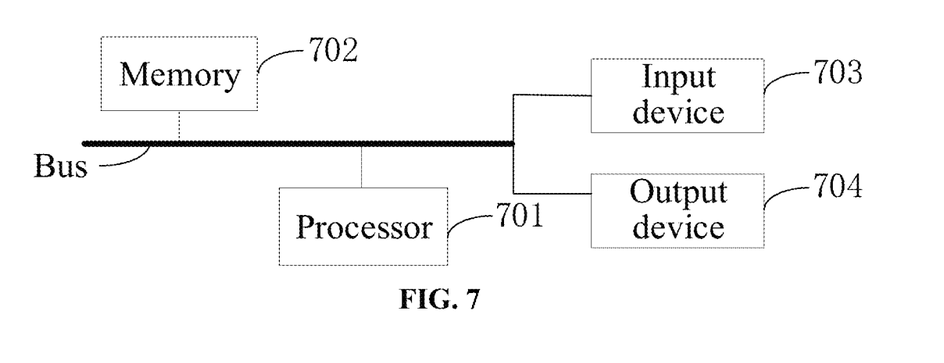
FIG. 7 is a block diagram of an electronic device that implements a method for generating a license plate defacement classification model or a license plate defacement classification method according to an embodiment of the present disclosure.

FIG. 7 shows a schematic block diagram of an example electronic device 700 that may be used to implement embodiments of the present disclosure. The electronic device is intended to represent various forms of digital computers, such as laptop computers, desktop computers, workstations, personal digital assistants, servers, blade servers, mainframe computers, and other suitable computers. The electronic device may also represent various forms of mobile devices, such as a personal digital assistant, a cellular telephone, a smart phone, a wearable device, and other similar computing devices. The components shown herein, their connections and relationships, and their functions are by way of example only and are not intended to limit the implementations of the present disclosure described and/or claimed herein.

As shown in FIG. 7, the electronic device may include one or more processors 701, a memory 702, and interfaces for connecting components, including high-speed interfaces and low-speed interfaces. The respective components are interconnected by different buses and may be mounted on a common main-board or otherwise as desired. The processor may process instructions executed within the electronic device, including instructions stored in or on the memory to display graphical information of a graphical user interface (GUI) on an external input/output device, such as a display device coupled to the interface. In other implementations, a plurality of processors and/or buses may be used with a plurality of memories, if necessary. Also, a plurality of electronic devices may be connected, each providing some of the necessary operations (e.g., as an array of servers, a set of blade servers, or a multiprocessor system). An example of a processor 701 is shown in FIG. 7.

The memory 702 is a non-transitory computer-readable storage medium provided by the present disclosure. The memory stores instructions executable by at least one processor to cause the at least one processor to execute the method for generating a license plate defacement classification model or the license plate defacement classification method provided by the present disclosure. The non-transitory computer-readable storage medium of the present disclosure stores computer instructions for enabling a computer to execute the method for generating a license plate defacement classification model or the license plate defacement classification method provided by the present disclosure.

The memory 702, as a non-transitory computer-readable storage medium, may be configured to store non-transitory software programs, non-transitory computer executable programs and modules, such as program instructions/modules corresponding to the method for generating a license plate defacement classification model or the license plate defacement classification method in the embodiments of the present disclosure. The processor 701 executes various functional applications and data processing of the server by running the non-transitory software programs, instructions and modules stored in the memory 702, that is, implements the method for generating a license plate defacement classification model or the license plate defacement classification method in the above method embodiments.

The memory 702 may include a program storage area and a data storage area, wherein the program storage area may store an operating system, and an application program required for at least one function; and the data storage area may store data created according to the use of the electronic device of analyzing and processing a searched result, etc. In addition, the memory 702 may include a high speed random access memory, and may also include a non-transitory memory, such as at least one disk storage device, a flash memory device, or other non-transitory solid state storage devices. In some embodiments, the memory 702 may alternatively include memories remotely located with respect to the processor 701, and these remote memories may be connected, via a network, to the electronic devices of analyzing and processing a searched result. Examples of such networks may include, but are not limited to, the Internet, an intranet, a local area network, a mobile communication network and combinations thereof.

The electronic device corresponding to the method for generating a license plate defacement classification model or the license plate defacement classification method in the embodiments of the present disclosure may further include an input device 703 and an output device 704. The processor 701, the memory 702, the input device 703, and the output device 704 may be connected by a bus or in other ways, and the bus connection is taken as an example in FIG. 7.

The input device 703 may receive input digitals or character information, and generate a key signal input related to a user setting and a function control of the electronic device of analyzing and processing a searched result. For example, the input device may be a touch screen, a keypad, a mouse, a track pad, a touch pad, a pointer stick, one or more mouse buttons, a track ball, a joystick, and other input devices. The output device 704 may include a display apparatus, an auxiliary lighting device (e.g., a light emitting diode (LED)), a tactile feedback device (e.g., a vibrating motor), etc. The display apparatus may include, but is not limited to, a liquid crystal display (LCD), an LED display, and a plasma display. In some embodiments, the display apparatus may be a touch screen.

Various implementations of the systems and techniques described herein may be implemented in a digital electronic circuit system, an integrated circuit system, an application specific integrated circuit (ASIC), a computer hardware, a firmware, a software, and/or a combination thereof. These various implementations may include an implementation in one or more computer programs, which can be executed and/or interpreted on a programmable system including at least one programmable processor; the programmable processor may be a dedicated or general-purpose programmable processor and capable of receiving and transmitting data and instructions from and to a storage system, at least one input device, and at least one output device.

These computing programs (also referred to as programs, software, software applications, or codes) may include machine instructions of a programmable processor, and may be implemented using high-level procedural and/or object-oriented programming languages, and/or assembly/machine languages. As used herein, the terms "machine-readable medium" and "computer-readable medium" may refer to any computer program product, apparatus, and/or device (e.g., a magnetic disk, an optical disk, a memory, a programmable logic device (PLD)) for providing machine instructions and/or data to a programmable processor, including a machine-readable medium that receives machine instructions as machine-readable signals. The term "machine-readable signal" may refer to any signal used to provide machine instructions and/or data to a programmable processor.

In order to provide an interaction with a user, the system and technology described here may be implemented on a computer having: a display device (e. g., a cathode ray tube (CRT) or a liquid crystal display (LCD) monitor) for displaying information to the user; and a keyboard and a pointing device (e. g., a mouse or a trackball), through which the user can provide an input to the computer. Other kinds of devices can also provide an interaction with the user. For example, a feedback provided to the user may be any form of sensory feedback (e.g., visual feedback, auditory feedback, or tactile feedback); and an input from the user may be received in any form, including an acoustic input, a voice input or a tactile input.

The systems and techniques described herein may be implemented in a computing system (e.g., as a data server) that may include a background component, or a computing system (e.g., an application server) that may include a middleware component, or a computing system (e.g., a user computer having a graphical user interface or a web browser through which a user may interact with embodiments of the systems and techniques described herein) that may include a front-end component, or a computing system that may include any combination of such background components, middleware components, or front-end components. The components of the system may be connected to each other through a digital data communication in any form or medium (e.g., a communication network). Examples of the communication network may include a local area network (LAN), a wide area network (WAN), and the Internet.

The computer system may include a client and a server. The client and the server are typically remote from each other and typically interact via the communication network. The relationship of the client and the server is generated by computer programs running on respective computers and having a client-server relationship with each other.

It should be understood that the steps can be reordered, added or deleted using the various flows illustrated above. For example, the steps described in the present disclosure may be performed concurrently, sequentially or in a different order, so long as the desired results of the technical solutions disclosed in the present disclosure can be achieved, and there is no limitation herein.

The above-described specific embodiments do not limit the scope of the present disclosure. It will be apparent to those skilled in the art that various modifications, combinations, sub-combinations and substitutions are possible, depending on design requirements and other factors. Any modifications, equivalent substitutions, and improvements within the spirit and principles of the present disclosure are intended to be included within the scope of the present disclosure.

What is claimed is:

1. A method for generating a license plate defacement classification model, comprising:
    acquiring training data, wherein the training data comprises a plurality of annotated vehicle images, annotated content comprises information indicating that a license plate is defaced or is not defaced, and the annotated content further comprises location information of a license plate area; and
    training a first neural network by using the training data, to obtain the license plate defacement classification model for predicting whether the license plate in a target vehicle image is defaced,
    wherein loss functions used in the training comprise a cross-entropy loss function and a class activation map loss function, the cross-entropy loss function is used for performing supervised learning on whether the license plate is defaced, and the class activation map loss function is used for performing supervised learning on a license plate location, wherein the class activation map loss function is obtained by comparing the annotated vehicle image with a class activation map corresponding to the annotated vehicle image.

2. The method of claim 1, wherein that the class activation map loss function is obtained by comparing the annotated vehicle image with a class activation map corresponding to the annotated vehicle image comprises:
    extracting a feature map of the annotated vehicle image by the first neural network;
    calculating the class activation map corresponding to the annotated vehicle image based on the feature map; and
    comparing an obtained class activation map with the annotated vehicle image, and using an element in an area except the license plate area in the class activation map as a loss, to obtain the class activation map loss function.

3. The method of claim 2, further comprising:
    performing upsampling or downsampling on the class activation map, such that dimensions of the class activation map and the annotated vehicle image are same.

4. The method of claim 1, wherein the location information of the license plate area is annotated with a bounding box.

5. The method of claim 4, wherein the class activation map loss function is expressed by a following formula:

$$L_{CAM} = \sum_{i=0}^{n} x_i w_i$$

wherein $L_{CAM}$ denotes a class activation map loss function, $x_i$ denotes an i-th element in a class activation map, and $w_i$ is a variable for determining whether the i-th element is located within a bbox, wherein in a case where the i-th element is located within the bbox, $w_i$ is 0, and in a case where the i-th element is located outside the bbox, $w_i$ is 1.

6. A license plate defacement classification method, which is based on a license plate defacement classification model generated by using operations of:
    acquiring training data, wherein the training data comprises a plurality of annotated vehicle images, annotated content comprises information indicating that a license plate is defaced or is not defaced, and the annotated content further comprises location information of a license plate area; and
    training a first neural network by using the training data, to obtain the license plate defacement classification model for predicting whether the license plate in a target vehicle image is defaced,
    wherein loss functions used in the training comprise a cross-entropy loss function and a class activation map loss function, the cross-entropy loss function is used for performing supervised learning on whether the license plate is defaced, and the class activation map loss function is used for performing supervised learning on a license plate location, wherein the class activation map loss function is obtained by comparing the annotated vehicle image with a class activation map corresponding to the annotated vehicle image,
    wherein the license plate defacement classification method comprises:
    inputting a target vehicle image to the license plate defacement classification model;
    predicting, by the license plate defacement classification model, whether a license plate in the target vehicle image is defaced; and
    receiving a prediction result output by the license plate defacement classification model, wherein the prediction result comprises information indicating that the license plate is defaced or is not defaced.

7. An electronic device, comprising:
    at least one processor; and
    a memory communicatively connected with the at least one processor,
    wherein the memory stores instructions executable by the at least one processor, the instructions being executed by the at least one processor to enable the at least one processor to execute operations of:

acquiring training data, wherein the training data comprises a plurality of annotated vehicle images, annotated content comprises information indicating that a license plate is defaced or is not defaced, and the annotated content further comprises location information of a license plate area; and training a first neural network by using the training data, to obtain the license plate defacement classification model for predicting whether the license plate in a target vehicle image is defaced, wherein loss functions used in the training comprise a cross-entropy loss function and a class activation map loss function, the cross-entropy loss function is used for performing supervised learning on whether the license plate is defaced, and the class activation map loss function is used for performing supervised learning on a license plate location, wherein the class activation map loss function is obtained by comparing the annotated vehicle image with a class activation map corresponding to the annotated vehicle image.

8. The electronic device of claim 7, wherein that the class activation map loss function is obtained by comparing the annotated vehicle image with a class activation map corresponding to the annotated vehicle image comprises:

extracting a feature map of the annotated vehicle image by the first neural network;

calculating the class activation map corresponding to the annotated vehicle image based on the feature map; and comparing an obtained class activation map with the annotated vehicle image, and using an element in an area except the license plate area in the class activation map as a loss, to obtain the class activation map loss function.

9. The electronic device of claim 8, wherein the instructions are executable by the at least one processor to enable the at least one processor to further execute an operation of:

performing upsampling or downsampling on the class activation map, such that dimensions of the class activation map and the annotated vehicle image are same.

10. The electronic device of claim 7, wherein the location information of the license plate area is annotated with a bounding box.

11. The electronic device of claim 10, wherein the class activation map loss function is expressed by a following formula:

$$L_{CAM} = \sum_{i=0}^{n} x_i w_i$$

wherein $L_{CAM}$ denotes a class activation map loss function, $x_i$ denotes an i-th element in a class activation map, and $w_i$ is a variable for determining whether the i-th element is located within a bbox, wherein in a case where the i-th element is located within the bbox, $w_i$ is 0, and in a case where the i-th element is located outside the bbox, $w_i$ is 1.

12. An electronic device, comprising:
at least one processor; and
a memory communicatively connected with the at least one processor,
wherein the memory stores instructions executable by the at least one processor, the instructions being executed by the at least one processor to enable the at least one processor to execute operations of:

inputting a target vehicle image to the license plate defacement classification model;

predicting, by the license plate defacement classification model, whether a license plate in the target vehicle image is defaced; and receiving a prediction result output by the license plate defacement classification model, wherein the prediction result comprises information indicating that the license plate is defaced or is not defaced, wherein the license plate defacement classification method is based on the license plate defacement classification model generated by using the method of claim 1.

13. The electronic device of claim 12, wherein that the class activation map loss function is obtained by comparing the annotated vehicle image with a class activation map corresponding to the annotated vehicle image comprises:

extracting a feature map of the annotated vehicle image by the first neural network;

calculating the class activation map corresponding to the annotated vehicle image based on the feature map; and comparing an obtained class activation map with the annotated vehicle image, and using an element in an area except the license plate area in the class activation map as a loss, to obtain the class activation map loss function.

14. The electronic device of claim 13, wherein the instructions are executable by the at least one processor to enable the at least one processor to further execute an operation of:

performing upsampling or downsampling on the class activation map, such that dimensions of the class activation map and the annotated vehicle image are same.

15. The electronic device of claim 12, wherein the location information of the license plate area is annotated with a bounding box.

16. The electronic device of claim 15, wherein the class activation map loss function is expressed by a following formula:

$$L_{CAM} = \sum_{i=0}^{n} x_i w_i$$

wherein $L_{CMA}$ denotes a class activation map loss function, $x_i$ denotes an i-th element in a class activation map, and $w_i$ is a variable for determining whether the i-th element is located within a bbox, wherein in a case where the i-th element is located within the bbox, $w_i$ is 0, and in a case where the i-th element is located outside the bbox, $w_i$ is 1.

17. A non-transitory computer-readable storage medium storing computer instructions for enabling a computer to execute the method of claim 1.

18. The non-transitory computer-readable storage medium of claim 17, wherein that the class activation map loss function is obtained by comparing the annotated vehicle image with a class activation map corresponding to the annotated vehicle image comprises:

extracting a feature map of the annotated vehicle image by the first neural network;

calculating the class activation map corresponding to the annotated vehicle image based on the feature map; and comparing an obtained class activation map with the annotated vehicle image, and using an element in an area except the license plate area in the class activation map as a loss, to obtain the class activation map loss function.

19. The non-transitory computer-readable storage medium of claim 18, wherein the computer instructions are executable by the computer to enable the computer to further execute an operation of:

performing upsampling or downsampling on the class activation map, such that dimensions of the class activation map and the annotated vehicle image are same.

20. A license plate defacement classification model, wherein the license plate defacement classification model is a license plate defacement classification model generated by using the method of claim 1.

* * * * *